United States Patent [19]

Weglage

[11] Patent Number: 4,577,382

[45] Date of Patent: Mar. 25, 1986

[54] SNAP RING TOOL

[75] Inventor: David E. Weglage, Trotwood, Ohio

[73] Assignee: Harold K. McIntire, Xenia, Ohio ; a part interest

[21] Appl. No.: 690,827

[22] Filed: Jan. 11, 1983

Related U.S. Application Data

[63] Continuation of Ser. No. 602,085, Apr. 18, 1984, abandoned, which is a continuation of Ser. No. 300,126, Sep. 8, 1981, abandoned.

[51] Int. Cl.[4] .............................................. B23P 19/04

[52] U.S. Cl. .......................................... 29/229; 81/302

[58] Field of Search .................... 81/302; 29/229, 225, 29/268

[56] References Cited

U.S. PATENT DOCUMENTS

| | | | |
|---|---|---|---|
| 1,100,486 | 6/1914 | Merliss . | |
| 1,707,947 | 4/1929 | Zettervall | 81/302 |
| 2,455,165 | 11/1948 | Feitl | 29/223 |
| 3,017,692 | 8/1959 | Burnell | 29/229 |
| 3,048,918 | 8/1962 | Kulp | 29/224 |
| 3,091,840 | 6/1963 | Anderson | 29/225 |
| 3,254,649 | 6/1966 | Wood | 128/321 |
| 3,371,401 | 3/1968 | Deguy | 29/229 |
| 3,650,008 | 3/1972 | Plouffe | 29/229 |
| 3,701,303 | 10/1972 | Kondo | 81/302 |
| 3,990,137 | 11/1976 | Kulba et al. | 29/229 |
| 4,050,464 | 9/1977 | Hall | 29/268 |
| 4,156,959 | 6/1979 | Weisenburger | 29/225 |

*Primary Examiner*—James L. Jones, Jr.
*Attorney, Agent, or Firm*—Dybvig & Dybvig

[57] ABSTRACT

A tool for installing and removing snap rings (40) of the type which includes a pliers-like implement (10) whose jaws (**12*b*,14*b*) are separated when handgrip members (12*a*,14*a*) are urged together, includes a narrow projection (36) mounted on one jaw (12*b*) for extending into a snap-ring hole (38) on one side of a snap-ring break (46), and a slot (42) on the other jaw (14*b*) into which a break edge (44) of the snap ring (40), on the other side of the break (46), fits. The narrow projection (36) is angled away from the opposite jaw (14*b*) and the slot (42) is narrower at one end than the other. The pliers-like implement (10) basically includes two arms (12,14) each forming a handgrip and a jaw, a circular-shaped fulcrum member (16) about which the two arms (12,14) pivot, and at least one circular spring (18,20) for biasing the two arms (13,14) together on the fulcrum member (16) and for preventing the fulcrum member (16**) from migrating away from its desired fulcrum position.

8 Claims, 7 Drawing Figures

SNAP RING TOOL

This is a continuation of application Ser. No. 602,085, filed Apr. 18, 1984, which was a continuation of application Ser. No. 300,126 filed Sept. 8, 1981, now abandoned.

BACKGROUND OF THE INVENTION

This invention relates broadly to the art of hand tools, and more particularly to pliers-like tools for installing and removing snap rings.

Snap ring removing tools, which generally involve pliers-like implements whose jaws expand when hand-grips are squeezed together, usually include pins, or narrow projections, for insertion into holes normally found on opposite sides of snap-ring "breaks". After such insertion, the hand-grips are urged together to expand the jaws and the engaged snap rings so that the snap rings can be installed or removed from slots about shafts. Such prior art snap ring tools are disclosed in U.S. Pat. Nos. 2,455,165 to Feitl, 3,371,401 to Deguy, 3,650,008 to Plouffe, and 3,990,137 to Kulba et al. The Deguy patent also discloses having the pins engage the break edges of snap rings which do not have holes.

A difficulty with such devices is that when snap rings are expanded therewith, they tend to swivel, or rotate, thereby requiring that they be expanded to an even larger amount before they can be easily removed from, or mounted in, snap-ring slots. When snap rings are expanded too much, they become fatigued or strained, which often renders them inappropriate for further use. Further, because of space requirements, it is often difficult to expand snap rings very much. Thus, it is an object of this invention, to provide a pliers-like implement for removing snap rings which impedes the snap rings from swivelling, or rotating during expansion thereof but yet which does not require complicated structure. The aforementioned Deguy patent discloses a second pair of jaws that are claimed to keep the snap rings from warping and which limit expansion of the rings, but the Deguy device is relatively complex, would be awkward to use, and has a limited ability to prevent warping.

Several suggestions have been made for employing similar prior-art implements which involve using grooves in jaws of the implements to engage opposite "break" edges of the clips or rings. Examples of these suggestions are found in U.S. Pat. Nos. 1,100,486 to Merliss and 3,254,649 to Wood. Although these implements may be useful for the particular applications for which they are disclosed (Merliss is a device for removing piston rings and Wood is a device for removing skin clips), they are not useful for removing snap rings because of difficulties involved in placing the implements in proper positions for removing the snap rings. Further, these implements would not positively hold the snap rings against disengagement. Thus, it is a further object of the invention to provide a pliers-like, snap-ring implement which can be relatively easily brought into positive engagement with snap rings and which thereafter retains them by positive engagement during manipulations of the snap rings.

It is a further object of this invention to provide such a pliers-like, expanding-jaw tool which is relatively uncomplicated to manufacture and use.

SUMMARY

According to principles of this invention, a pliers-like expanding-jaw tool includes a narrow projection on one jaw for extending into a snap-ring hole on one side of a "break", and a slot on the other jaw for engaging the break edge of the snap ring on the opposite side of the break. Such an arrangement allows easy engagement of the snap ring with the tool and also prevents snap-ring swivelling during manipulation thereof with the tool. In the preferred embodiment, the projection is angled away from the opposite jaw. Further, the slot is deeper on one side than the other so that an inside wall, forming its trough, is thin on one side to allow easy insertion into the "break" of a snap ring. The slot is also on an angle with regard to a perpendicular plane of the implement so that the implement may be held on an angle, away from a shaft on which a snap ring is to be mounted.

A simplified pliers-like structure of this invention includes two arms having arcuately shaped notches therein for rotating about a circularly-shaped fulcrum member. The arms are held against the fulcrum member by at least one loop-shaped spring which encircle the fulcrum member to prevent it from migrating from its proper fulcrum position in the notches.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
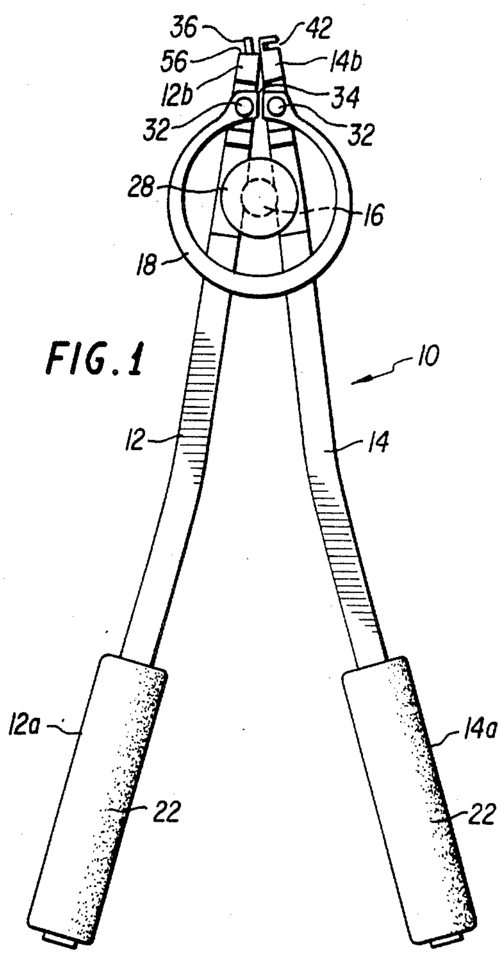
FIG. 1 is a top view of a pliers-like snap-ring implement according to principles of this invention.

A pliers-like snap-ring implement 10 comprises arms 12 and 14, a fulcrum member 16, and two circular springs 18 and 20.

The arms 14 and 12 each comprise hand-grip portions **12*a* and 14*a* and jaw portions 12*b* and 14*b*. The hand-grip portions 12*a* and 14*a* have hand-grip material 22 thereon to aid a user in gripping the hand-grip portions 12*a* and 14*a* for urging them together. Arcuately shaped notches 24 are defined in the arms 12 and 14 between the hand-grip portions 12*a*,14*a* and the jaw portions 12*b*,14*b*. These notches ride on a circular axle 26 of the fulcrum member 16. The fulcrum member 16 further includes flanges 28 and 30 integral with the circular axle 26 at opposite ends thereof so as to prevent the arms 12 and 14** from lateral movement.

The circular springs 18 and 20 are depicted as being formed of normal snap rings. These springs are attached to the jaw portions **12*b* and 14*b* of the arms 12 and 14 by attaching elements 32 which are located on opposite sides of breaks 34 in the springs 18 and 20. It should be noted that the springs 18 and 20 encircle the flanges 28 and 30 of the fulcrum member 16 to prevent the fulcrum member 16 from migrating longitudinally between the arms 12 and 14. Generally, the fulcrum member 16 is held clamped between the notches 24 in the arms 12 and 14 by the circular springs 18 and 20**.

Figure 4A:
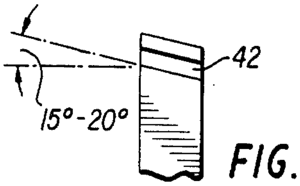
FIG. 4A is a side view of a portion of the FIG. 1 structure, as viewed from the right of FIG. 1.
Figure 4:
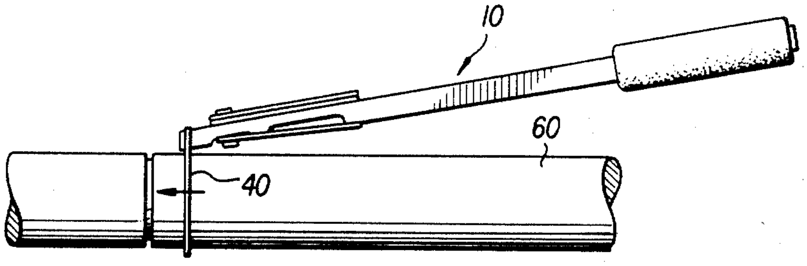
FIG. 4 is a simplified side view of a shaft having a snap ring manipulated thereon by a tool employing principles of this invention.

With regard to the jaw portions **12*b* and 14*b* of implement 10, the first jaw portion 12*b* has a narrow projection 36 of a size to fit into a hole 38 of a normal snap ring 40 (FIG. 4). The second jaw portion 14*b* defines a slot 42 of a size for engaging a "break" edge 44 of the snap ring 40. In this respect, snap rings, such as the snap ring 40, generally form circles, however, they are not continuous, but rather have "breaks" 46 therein with holes 38 defined by the snap ring on opposite sides of the breaks 46. As was already mentioned, most prior-art snap-ring manipulating devices include two protrusions, one for insertion in each of the holes 38 on opposite sides of the breaks 46**.

Figure 2:
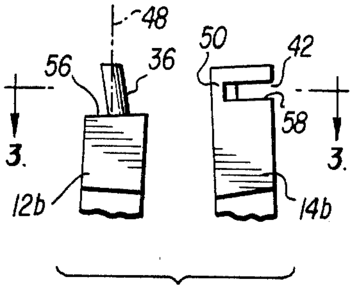
FIG. 2 is an enlarged view of a portion of the implement of FIG. 1.

With further regard to the projection 36 and the slot 42 of this invention, as can be seen in FIG. 2 (although greatly exaggerated therein) the projection 36 angles away from the jaw portion **14*b* defining the slot 42. In actual practice, the angle that the projection 36 forms with an imaginary line in longitudinal alignment with the jaw portion 12*b*** is between 10 and 20 degrees.

An inside wall 50 of the slot 42, similarly, is beveled so that a first edge 52 thereof is quite sharp, while a second edge 54 is not so sharp. This beveled inside wall enables a user to insert the inside wall between the breaks 46 in snap rings 40.

Finally, with regard to the jaw portions **12*b* and 14*b*, their active surfaces 56 and 58 are on angles with perpendicular surfaces to the longitudinal line 48 depicted in FIG. 2, as can best be seen in FIG. 4A. This arrangement enables the tool to be used with hand-grip portions 12*a* and 14*a* spaced from a shaft 60 on which a snap ring 40 is to be mounted, as is illustrated in FIG. 4**.

In operation, the circular springs 18 and 20 hold the arms 12 and 14 firmly against the circular axle 26 at the notches 24. The circular springs 18 and 20 are biased to hold their breaks edges 62 close together and since the break edges 62 are attached to the jaw portions **12*b* and 14*b*, the implement 10 is biased to have its jaw portions together. To separate the jaw portions, the hand-grip portions 12*a* and 14*a* are urged together, thereby causing the arms 12 and 14 to rotate about the axle 26, opening the jaw portions 12*b* and 14*b***.

Figure 3:
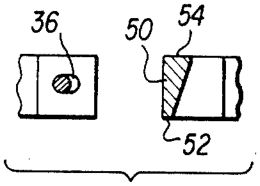
FIG. 3 is a sectional view taken on line 3—3 in FIG. 2.
Figure 5:
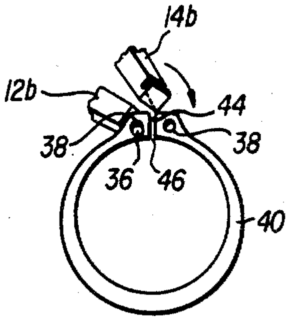
FIG. 5 is a bottom view of a snap ring engaged with one jaw of an implement employing principles of this invention.
Figure 6:
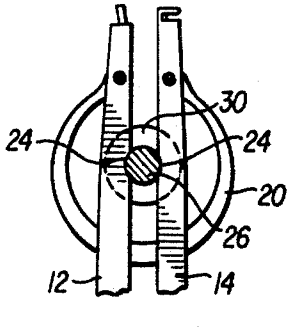
FIG. 6 is a fragmented sectional view of the fulcrum portion of the FIG. 1 implement.

To manipulate a snap ring 40 with the implement 10, the narrow projection 36 is inserted into a hole 38 on a first side of a break 46 in the snap ring 40, as is depicted in FIG. 5. Thereafter, using the projection 36 as an axis, the implement 10 is rotated so that the narrow first edge 52 (FIG. 3) of the inside wall 50 is inserted into the break 46 of the snap ring 40, and a break edge 44 of the snap ring is thereby inserted into the slot 42 of jaw portion **12*b*. Once both the projection 36 and the slot 42 are positively engaged with opposite sides of the break 46 of the snap ring 40, hand-grip portions 12*a* and 14*a* are urged together to expand the break 46, and thereby expand the snap ring 40**. In this manner the snap ring is either removed from, or installed about, a shaft or other member.

The slot 42, being relatively deep and narrow, positively engages opposite sides of the snap ring 40 and prevents swivelling, or twisting, thereof when the snap ring 40 is expanded. Similarly, the angle of the projection 56 insures that this projection positively engages the hole 38 of the snap ring 40 throughout manipulation of the snap ring 40. The bevel of the inside wall 50 of the slot 42 enables one to more conveniently engage the slot 42 with a break edge of the snap ring 40.

It will be appreciated by those skilled in the art that the pliers-like expanding implement described herein is uncomplicated in structure, being easy to fabricate and manipulate.

While the invention has been particularly shown and described with reference to a preferred embodiment, it will be understood by those skilled in the art that various changes in form and detail may be made therein without departing from the spirit and scope of the invention. For example, the projection/slot working members of the jaw portions **12*b* and 14*b*** could be mounted on other pliers-like implements. Also, the pliers-like implement described herein could be used with other types of expanding devices.

The embodiments of the invention in which an exclusive property or privilege are claimed are defined as follows:

1. In a snap ring tool of the type comprising a pliers-like implement having at least two hand-grip members, at least first and second jaw members, and means for interconnecting said hand-grip members with said jaw members to cause said jaw members to separate when said hand-grip members are urged toward one another, each of said jaw members including snap-ring engaging means for respectively engaging a snap ring on opposite sides of a break in said snap ring to force said opposite sides apart and thereby expand said snap ring, the improvement wherein said snap-ring engaging means of said first jaw member comprises projection means for extending along a projection axis into a snap-ring hole on a first side of the break in said snap ring, and said snap-ring engaging means of said second jaw member comprises means defining a slot having two opposite sidewall surfaces and an inside-wall surface, said two opposite sidewall surfaces lying substantially in planes transverse to said projection axis and said inside-wall surface being formed by a wall adjacent said projection axis, said slot having an open side in the direction facing laterally away from said projection axis in which the edge of said snap ring at said break can be inserted with a break edge surface of said snap ring on the second side of the break contacting said inside-wall surface of said slot and the two opposite sidewall surfaces of said slot being positioned on opposite sides of said snap ring for preventing swiveling thereof, whereby, when both of said snap-ring engaging means are engaged with said snap ring, said hand-grip members can be squeezed together to cause said jaw members to separate, thereby forcing the sides of said snap ring apart, while said tool holds said snap ring in a substantially planar configuration.

2. In a snap ring tool as in claim 1 wherein said projection means angles away from said second jaw member.

3. In a snap ring tool as in claim 1 wherein said slot is at an oblique angle to a plane perpendicular to an imaginary longitudinal line running through the jaw member defining the slot.

4. In a snap ring tool as in claim 1, wherein said pliers-like implement comprises a circular axle and two arms, each of said arms comprising one of said hand-grip members and one of said jaw members, said arm having arcuately shaped surfaces which ride on said circular axle, said implement further including a loop-shaped spring having a break therein, and means fastening end portions of said spring on opposite sides of the break therein to said arms, said spring substantially surrounding said axle, said spring urging said arms together on said axle at their arcuately shaped surfaces and preventing migration of said axle from between said arms.

5. In a snap-ring tool as in claim 1, wherein the inside-wall portion of said second jaw member defining the inside-wall surface of said slot is narrower at one end of the slot than the other, the narrower end being sufficiently narrow to allow it to be inserted into breaks of snap-rings.

6. In a snap-ring tool as in claim 2, wherein the inside-wall portion of said second jaw member defining the inside-wall surface of said slot is narrower at one end of the slot than the other, the narrower end being sufficiently narrow to allow it to be inserted into breaks of snap-rings.

7. In a snap-ring tool as in claim 5, wherein said jaw members pivot about an axis and said slot is slanted so that said narrower end of said inside-wall portion is farther from said axis than is said other end of said inside-wall portion.

8. In a snap-ring tool as in claim 6, wherein said jaw members pivot about an axis and said slot is slanted so that said narrower end of said inside-wall portion is farther from said axis than is said other end of said inside-wall portion.

* * * * *